United States Patent
Hoshino et al.

(10) Patent No.: US 7,754,359 B2
(45) Date of Patent: Jul. 13, 2010

(54) SOLID OXIDE FUEL CELL

(75) Inventors: Koji Hoshino, Naka-gun (JP); Kei Hosoi, Naka-gun (JP); Takashi Yamada, Naka-gun (JP); Jun Akikusa, Naka-gun (JP)

(73) Assignees: Mitsubishi Materials Corp., Tokyo (JP); The Kansai Electric Power Co., Inc., Osaka (JP)

( * ) Notice: Subject to any disclaimer, the term of this patent is extended or adjusted under 35 U.S.C. 154(b) by 0 days.

(21) Appl. No.: 11/716,612

(22) Filed: Mar. 12, 2007

(65) Prior Publication Data

US 2007/0166593 A1 Jul. 19, 2007

Related U.S. Application Data

(62) Division of application No. 10/507,308, filed as application No. PCT/JP03/02690 on Mar. 7, 2003, now abandoned.

(30) Foreign Application Priority Data

Mar. 11, 2003 (JP) ............................. 2002-065131
Mar. 13, 2003 (JP) ............................. 2002-068490

(51) Int. Cl.
*H01M 8/12* (2006.01)
(52) U.S. Cl. .......................................... 429/12; 429/33
(58) Field of Classification Search ............ 429/12, 429/33
See application file for complete search history.

(56) References Cited

U.S. PATENT DOCUMENTS 5,985,476 A 11/1999 Wachsman et al.
6,287,716 B1 9/2001 Hashimoto et al.
2002/0028367 A1 3/2002 Sammes et al.

FOREIGN PATENT DOCUMENTS

| | | |
|---|---|---|
| DE | 199 49 431 | 4/2000 |
| EP | 1 170 812 | 1/2002 |
| JP | 03-095859 | 4/1991 |
| JP | 2001-052722 | 2/2001 |
| JP | 2001-351646 | 12/2001 |
| WO | 02/17420 | 2/2002 |

OTHER PUBLICATIONS

Supplementary European Search Report for corresponding European Application No. 03744010 dated Oct. 19, 2007.

*Primary Examiner*—Jane Rhee
(74) *Attorney, Agent, or Firm*—Wenderoth, Lind & Ponack, L.L.P.

(57) ABSTRACT

A solid oxide fuel cell provided with a power cell (1) in which a fuel electrode layer (4) is arranged on one surface of a solid electrolyte layer (3) and an air electrode layer (2) is arranged on the other surface thereof, wherein the solid electrolyte layer (3) has a two layer structure including a first electrolyte layer (3a) made of a ceria based oxide material and a second electrolyte layer (3b) made of a lanthanum gallate based oxide material, and the second electrolyte layer is formed on the side of the air electrode layer. Preferably, the material composition for the fuel electrode layer (4) is a mixture of Ni and $CeSmO_2$, wherein the composition ratio of component materials is graded along the thickness thereof in such a way that the quantity of Ni is made less than the quantity of $CeSmO_2$ near the boundary interface with said solid electrolyte layer, and the mixing ratio of Ni is gradually increased with an increasing distance away from the interface.

1 Claim, 3 Drawing Sheets

SOLID OXIDE FUEL CELL

This application is a Divisional application of Ser. No. 10/507,308 filed Sep. 10, 2004 now abandoned, which is 371 application of PCT/JP03/02690, filed Mar. 7, 2003.

TECHNICAL FIELD

The present invention relates to a solid oxide fuel cell which is provided with a power cell formed by arranging a fuel electrode layer on one side of a solid electrolyte layer and an air electrode layer on the other side of the solid electrolyte layer. More specifically, the present invention relates to a solid oxide fuel cell provided with a solid electrolyte layer improving the electric power generation performance of the electric power generation cell, or provided with a fuel electrode layer improving the durability of the fuel cell.

BACKGROUND ART

The development of a solid oxide fuel cell, having a layered structure in which a solid electrolyte layer made of an oxide ion conductor is sandwiched between an air electrode layer (oxidant electrode layer) and a fuel electrode layer, is progressing as a third-generation fuel cell for use in electric power generation. In a solid oxide fuel cell, oxygen (air) is supplied to the air electrode section and a fuel gas ($H_2$, CO and the like) is supplied to the fuel electrode section. The air electrode and the fuel electrode are both made to be porous so that the gases can reach the interfaces in contact with the solid electrolyte.

The oxygen supplied to the air electrode section passes through the pores in the air electrode layer and reaches the neighborhood of the interface in contact with the solid electrolyte layer, and in that portion, the oxygen receives electrons from the air electrode to be ionized into oxide ions ($O^{2-}$). The generated oxide ions move in the solid electrolyte layer by diffusion toward the fuel electrode. The oxide ions having reached the neighborhood of the interface in contact with the fuel electrode react with the fuel gas in that portion to produce reaction products ($H_2O$, $CO_2$ and the like), and release electrons to the fuel electrode.

The electrode reaction when hydrogen is used as fuel is as follows:

Air electrode: 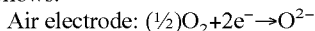
$(1/2)O_2 + 2e^- \rightarrow O^{2-}$

Fuel electrode: 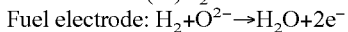
$H_2 + O^{2-} \rightarrow H_2O + 2e^-$

Overall: 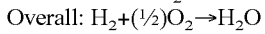
$H_2 + (1/2)O_2 \rightarrow H_2O$

FIG. 5 shows the internal structure of the electric power generation cell 1 in a conventional solid oxide fuel cell; in this figure, reference numeral 2 denotes an air electrode (cathode) layer, reference numeral 3 denotes a solid electrolyte layer, reference numeral 4 denotes a fuel electrode (anode) layer, and the air electrode layer 2 and the fuel electrode layer 4 are arranged respectively on both surfaces of the solid electrolyte layer 3 so as to sandwich the solid electrolyte layer 3 therebetween. Conventionally, in general, a power cell has a structure in which each layer is formed as a single layer as shown in the figure.

Here, the air electrode layer 2 and the fuel electrode layer 4 need to be formed of materials having high electronic conductivity. Because the air electrode material is required to be chemically stable in the oxidative atmosphere of high temperatures around 700° C., metals are unsuitable for the air electrode, and generally used are perovskite type oxide materials having electronic conductivity, specifically $LaMnO_3$ or $LaCoO_3$, or the solid solutions in which part of the La component in these materials is replaced with Sr, Ca and the like.

Additionally, as the fuel electrode material, generally used is a metal such as Ni or Co, or a cermet such as Ni-YSZ or Co-YSZ.

Because the solid electrolyte layer 3 is the medium for migration of the oxide ions and also functions as a partition wall for preventing the direct contact of the fuel gas with air, the solid electrolyte layer 3 has adense structure capable of blocking gas permeation. It is required that the solid electrolyte layer 3 is formed of a material having high oxide ion conductivity, and chemically stable and strong against thermal shock under the conditions involving the oxidative atmosphere in the air electrode layer section and the reductive atmosphere in the fuel electrode layer section. As a material which can meet such requirements, generally used is an yttria stabilized zirconia (YSZ) which displays a relatively high oxide ion conductivity at high temperatures; however, in these years, the operation temperature of solid oxide fuel cells tend to be lowered, and accordingly ceria based oxide materials (ceria added with samarium) have come to be used which are slightly weak in the high temperature reductive atmosphere, but display excellent electric conductivity at low temperatures. Additionally, Japanese Patent Laid-Open No. 2001-52722 discloses solid oxide fuel cells in which as the solid electrolyte, used are the lanthanum gallate based oxide materials displaying high oxide ion conductivities.

As described above, there have hitherto been made many researches and improvements on the materials and the like for the solid electrolyte layer; additionally, various improvements have hitherto been made on the fuel electrode layer.

A power cell in which an yttria stabilized zirconia or a samaria doped ceria (SDC) is used as the solid electrolyte layer 3 has a drawback such that the internal resistance in the air electrode section becomes large; in particular, in the case of the samarium loaded ceria, the samarium loaded ceria displays an excellent electric property at low temperatures, as described above, but is a mixed electron-oxide ion conductor, and is low in the proportion of the oxide ion conductivity, which is a cause to raise the internal resistance. Additionally, a power cell in which a lanthanum gallate based oxide material is used as the solid electrolyte layer has a tendency such that on the contrary to the above described case, the internal resistance in the fuel electrode section becomes large, and additionally has a drawback such that the lanthanum gallate based oxide material is relatively expensive. Anyway, when the internal resistance is high, the IR loss is increased and no efficient electric power generation can be expected.

On the other hand, in a power cell provided with a fuel electrode layer 4 having a single layer structure as shown in FIG. 5, an excellent electric power generation property (current-voltage-electric power property) is displayed for the short term test of the electric power generation, but a problem involving the durability has been revealed to remain unsolved in the long term test of the electric power generation.

The electric power generation cell in a solid oxide fuel cell is required to have a durability of 40 to 50 thousands hours for practical use; in the case of the electric power generation cell of a conventional structure shown in FIG. 5, a degradation of the electric power generation property is found in a durability test for about 100 hours. The conceivable main causes for the degradation include the phenomenon of the exfoliation between the solid electrolyte layer 3 and the electrode layers (particularly the fuel electrode layer 4) and the mutual diffusion of the metal elements between the solid electrolyte layer 3 and the electrode layers.

As for the exfoliation of the fuel electrode layer 4, it is conceivable that the metals such as Ni contained in the fuel electrode layer 4 are baked to the solid electrolyte layer 3 in the conditions of oxides, and the fuel electrode layer 4 is exfoliated from the solid electrolyte layer 3 owing to the sintering shrinkage caused by the reduction at the time of electric power generation; additionally, it is also conceivable that the diffusion of the Ni and the like, which are the materials for the fuel electrode layer 4, into the solid electrolyte layer 3 degrades the performance of the solid electrolyte layer 3.

DISCLOSURE OF THE INVENTION

An object of the present invention is, in view of the above described conventional problems, the provision of a solid oxide fuel cell provided with an inexpensive solid electrolyte layer which can reduce the contact resistances in the interfaces between the solid electrolyte layer and the respective electrode layers, and can thereby improve the generation efficiency.

A solid oxide fuel cell of the present invention for achieving the above described object is a solid oxide fuel cell provided with a power cell formed by arranging a fuel electrode layer on one side of a solid electrolyte layer and an air electrode layer on the other side of the solid electrolyte layer, the solid oxide fuel cell being characterized in that the solid electrolyte layer is made to have a two layer structure including a first electrolyte layer made of a ceria based oxide material and a second electrolyte layer made of a lanthanum gallate based oxide material; and the second electrolyte layer is formed on the side of the air electrode layer.

According to the present invention in which the electrolyte layer is made to have a two layer structure, the first electrolyte layer is made of a ceria based oxide material, and the contact resistance in the interface in contact with the fuel electrode layer can thereby be reduced; moreover, the second electrolyte layer is made of a lanthanum gallate based oxide material displaying a high oxide ion conductivity, and the contact resistance in the interface in contact with the air electrode layer can thereby be reduced. Consequently, the internal resistance in the electric power generation cell is reduced, and the electric power generation property is improved.

In the present invention having the above described configuration, it is preferable that the first electrolyte layer is formed thinner than the second electrolyte layer. By forming as a thin layer the second electrolyte layer made of an expensive lanthanum gallate based oxide material, the cost reduction of the electric power generation cell comes to be possible.

Furthermore, another object of the present invention is the provision of a solid oxide fuel cell which can improve the electric power generation property of the electricity generation cell and can achieve the improvement of the durability of the fuel cell.

The solid oxide fuel cell of the present invention that is to achieve the improvement of the durability is a solid oxide fuel cell provided with a power cell formed by arranging a fuel electrode layer on one side of a solid electrolyte layer and an air electrode layer on the other side of the solid electrolyte layer, the solid oxide fuel cell being characterized in that the composition ratio of component materials in the fuel electrode layer is graded along the thickness thereof.

The fuel electrode layer is made to have a layered structure including two or more layers, and can have a configuration in which the composition ratio of component materials in the fuel electrode layer is graded along the layering direction thereof by varying the composition ratio of component materials in the respective layers.

Additionally, the material composition for the fuel electrode layer is preferably a mixture of Ni and $CeSmO_2$ (samaria doped ceria, SDC); and the composition ratio of component materials in the fuel electrode layer is preferably graded along the thickness thereof in such a way that the mixed quantity of Ni is made less than the mixed quantity of $CeSmO_2$ near the boundary interface in contact with the solid electrolyte layer, and the mixing ratio of Ni is gradually increased with increasing distance away from the interface.

According to the present invention having a configuration in which the composition ratio of component materials in the fuel electrode layer is graded along the thickness thereof, the resistance to the exfoliation between the fuel electrode layer and the solid electrolyte layer is improved, and simultaneously suppressed is a phenomenon such that the metal materials such as Ni in the fuel electrode layer diffuse into the solid electrolyte layer, so that the electric power generation property of the electric power generation cell is improved, and the durability of the solid oxide fuel cell is improved.

BEST MODE FOR CARRYING OUT THE INVENTION

Figure 1:
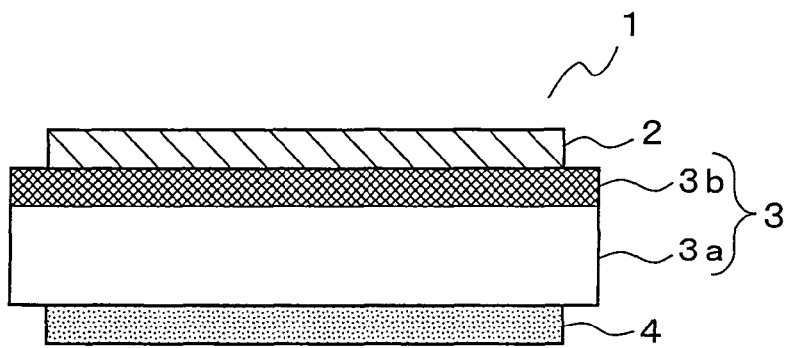
FIG. 1 is a sectional view illustrating an example of the structure of a power cell of the present invention in which the electrolyte layer is made to have a two layer structure.

FIG. 1 illustrates an example of a power cell in a solid oxide fuel cell of the present invention in which the electric power generation cell is provided with a configuration having an electrolyte layer made to have a two layer structure.

The electric power generation cell 1 shown in FIG. 1 is constituted with a porous air electrode layer 2 in contact with the air, a solid electrolyte layer 3 which is a medium for migration of oxide ions, and a fuel electrode layer 4 in contact with a fuel such as hydrogen gas; the air electrode layer 2 and the fuel electrode layer 4 are arranged respectively on both surfaces of the solid electrolyte layer 3 so as to sandwich the solid electrolyte layer 3 therebetween.

The air electrode layer 2 is formed of a perovskite type oxide material having electronic conductivity, specifically, $LaMnO_3$ or $LaCoO_3$, or a solid solution in which part of the La component is replaced with Sr, Ca and the like, and the fuel electrode layer 4 is formed of a metal such as Ni or Co, or a cermet such as Ni-YSZ or Co-YSZ.

Additionally, the solid electrolyte layer 3 has a two layer structure, in contrast to the conventional structure, including a first electrolyte layer 3a and a second electrolyte layer 3b. For the first electrolyte layer 3a in contact with the fuel electrode layer 4, used is an inexpensive samaria doped ceria ($CeSmO_2$) which is an electron-oxide ion mixed conductor displaying excellent electric conductivity at low temperatures, and for the second electrolyte layer 3b in contact with the air electrode layer 2, used is a lanthanum gallate based oxide material having high oxide ion conductivity.

In the example shown in FIG. 1, the solid electrolyte layer 3 is formed in such a way that the thickness of the inexpensive first electrolyte layer 3a is made thicker, and the thickness of the relatively expensive second electrolyte layer 3b is made thinner. Incidentally, it is preferable that in relation to the thickness of the first electrolyte layer 3a made to be 100 to 400 μm, the thickness of the second electrolyte layer 3b is made to be of the order of 30 to 100 μm. Incidentally, if the thickness of the second electrolyte layer 3b is made to be 30 μm or less, there is a possibility that the second electrolyte layer can hardly play the role of an electrolyte layer, while if the thickness of the second electrolyte layer is made to be 100 μm or more, there occur problems involving the IR loss and the cost to be described later.

The electric discharge reaction in a fuel cell proceeds irreversibly, and the more the current taken out to the outside becomes large, the more the irreversibility increases and the more the cell voltage falls. The maximum voltage obtainable in an actual fuel cell is the equilibrium electromotive force and the voltage falls with increasing irreversibility.

Such a voltage fall is caused by the diffusive movement resistance of the electrons in the fuel electrode layer and the air electrode layer, in other words, by the ionization reaction rate of the oxide ion, and the potential deviation from the equilibrium potential in each of the air electrode layer and the fuel electrode layer is called overvoltage (polarization). Electrons flow in the electrodes and ions flow in the electrolyte, and thus electric current flows to the outside. At this time, generated is the voltage loss (IR loss) corresponding to the product between the current flowing in the cell and the electric resistance involving the contact resistances between the solid electrolyte layer and the respective electrode layers and the resistances of the electrode materials themselves and solid electrolyte itself, the IR loss becoming larger in proportion to the current taken out to the outside.

All the energy corresponding to the difference between the potential converted from the thermal energy obtained by combustion of the fuel and the potential which can be taken out from a power cell is vainly released as thermal energy from the electric power generation cell of a fuel cell. Therefore, the overvoltage of each above described electrode and the amount of the IR loss inside each electric power generation cell will significantly influence the generation efficiency of a fuel cell.

In the electric power generation cell 1 shown in FIG. 1, the formation of the first electrolyte layer 3a with a ceria based oxide material reduces the contact resistance of the interface in contact with the fuel electrode layer 4, and the formation of the second electrolyte layer 3b with a lanthanum gallate based oxide material, displaying high oxide ion conductivity, reduces the contact resistance of the interface in contact with the air electrode layer 2. These reductions are probably ascribable to the satisfactory material compatibility between the respective electrode layers 2, 4 and the solid electrolyte layer 3 in contact with these electrode layers, and the contactability of every layer is thereby improved.

Such an electrolyte layer structure lowers the internal resistance of the electric power generation cell 1, and the lowering of the electromotive force due to the IR loss is thereby suppressed, so that the improvement of the electric power generation property can be expected.

Quantity reduction of the expensive lanthanum gallate based oxide material by reducing the thickness of the second electrolyte layer 3b makes it possible to reduce the cost for the electric power generation cell 1. Accordingly, formation of the second electrolyte layer 3b to be reduced in thickness as much as possible within the range not affecting adversely leads to amerit in cost. In order to make up for this reduction in thickness, the first inexpensive electrolyte layer 3a is made thicker, whereby the two layers are formed such that the solid electrolyte layer 3 maintains a predetermined thickness.

Figure 2:
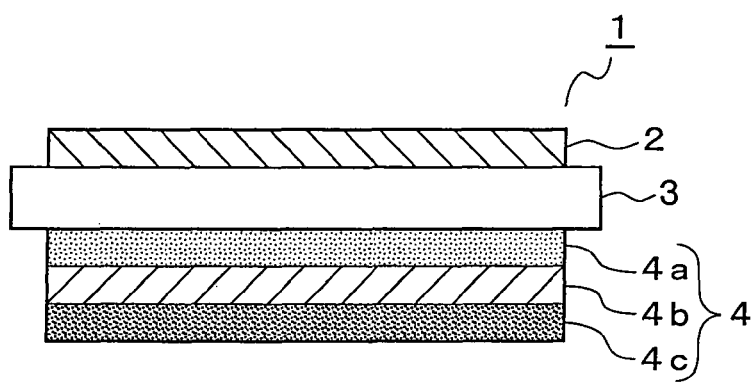
FIG. 2 is a sectional view illustrating an example of the structure of a power cell of the present invention in which the composition ratio of component materials in the fuel electrode layer is graded along the thickness thereof.
Figure 3:
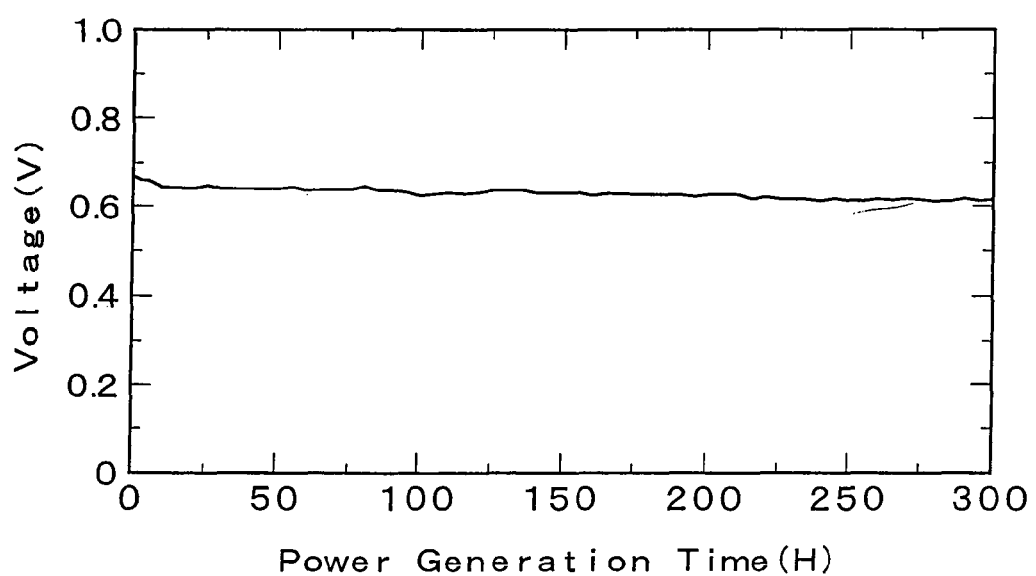
FIG. 3 is a graph showing an electric power generation property of the electric power generation cell having the structure shown in FIG. 2.

FIG. 2 shows a power cell in a solid oxide fuel cell of the present invention, and illustrates an example of a power cell provided with a configuration in which the composition ratio of component materials in the fuel electrode layer is graded along the thickness thereof. Additionally, FIG. 3 is a graph showing an electric power generation property of the electric power generation cell shown in FIG. 2.

The electric power generation cell 1 shown in FIG. 2 is constituted with an air electrode layer 2, a solid electrolyte layer 3, and a fuel electrode layer 4; the air electrode layer 2 and the fuel electrode layer 4 are arranged respectively on both surfaces of the solid electrolyte layer 3 so as to sandwich the solid electrolyte layer 3 therebetween.

Furthermore, the fuel electrode layer 4 is formed to have a three layer structure including a fuel electrode layer 4a, a fuel electrode layer 4b and a fuel electrode layer 4c; the composition ratio of component materials in the respective layers are varied in such a way that the composition ratio of component materials in the fuel electrode layer 4 is made to have a gradation along the layering direction. In the present example, as for the composition of the fuel electrode layer 4, amixture of Ni and $CeSmO_2$ is used; and the composition ratio of component materials in the fuel electrode layer 4 is graded along the thickness thereof in such a way that the mixed quantity of Ni is made less than the mixed quantity of $CeSmO_2$ near the interface in contact with the solid electrolyte layer 3, and the mixing ratio of Ni is gradually increased with increasing distance away from the interface.

For formation of the fuel electrode layer 4 as described above, applicable are various molding methods well known in the art including the doctor blade method, the screen printing method, the curtain coating method and the spin coating method.

In the present example, the fuel electrode layer 4a was made to have a quantity of Ni falling within the range of 0 to 60 vol % in relation to $CeSmO_2$ in terms of the mixing ratio between Ni and $CeSmO_2$, the fuel electrode layer 4b was made to have a Ni quantity being larger than the Ni quantity in the fuel electrode layer 4a and falling within the range of 5 to 70 vol % and, and the fuel electrode layer 4c was made to have a Ni quantity being larger than the Ni quantity in the fuel electrode layer 4b and falling within the range of 10 to 80 vol %.

As described above, the fuel electrode layer 4 is made to have a dense structure near the interface in contact with the solid electrolyte layer 3 by making the mixing quantity of Ni smaller, and the contactability of the fuel electrode layer 4 with the solid electrolyte layer 3 is thereby improved, so that the resistance to the exfoliation between the solid electrolyte layer 3 and the fuel electrode layer 4 can be improved. Additionally, the formation of the dense structure makes it possible to reduce the contact resistance of the interface between the solid electrolyte layer 3 and the fuel. electrode layer 4, and accordingly it is possible to reduce the internal resistance of the electric power generation cell 1; the reduction of the mixing quantity of Ni near the interface leads to the reduction of the quantity of Ni diffusing into the solid electrolyte layer 3; and consequently, the electric power generation property of the electric power generation cell 1 is improved, and the durability of the solid oxide fuel cell can be improved. The gradation of the composition ratio of component materials in the fuel electrode layer 4 along the thickness thereof within the above described mixing ratios makes it possible to maintain the overall composition quantities of Ni and CeSmO$_2$ in the fuel electrode material at certain preferable values for achieving a satisfactory generation efficiency.

For the purpose of checking the effect of the present invention having a configuration in which the composition ratio of component materials in the fuel electrode layer is graded along the thickness thereof, the durability tests as illustrated by the following example and the following comparative example were carried out, and the respective electric power generation properties of the example and the comparative example were investigated.

EXAMPLE

With reference to FIG. 2, the material for the air electrode layer 2 was $Sm_{0.5}Sr_{0.5}CoO_3$; the material for the solid electrolyte layer 3 was $La_{0.8}Sr_{0.2}Ga_{0.8}Mg_{0.15}Co_{0.05}O_3$; the composition ratio of component materials in the fuel electrode layer 4a was such that Ni(0 vol %)/$Ce_{0.8}Sm_{0.2}O_2$ (100 vol %); the composition ratio of component materials in the fuel electrode layer 4b was such that Ni(10 vol %)/$Ce_{0.8}Sm_{0.2}O_2$ (90 vol %); the composition ratio of component materials in the fuel electrode layer 4c was such that Ni(40 vol %)/$Ce_{0.8}Sm_{0.2}O_2$ (60 vol %); and thus a power cell was formed and the obtained electric power generation property is shown in FIG. 3.

COMPARATIVE EXAMPLE

Figure 5:
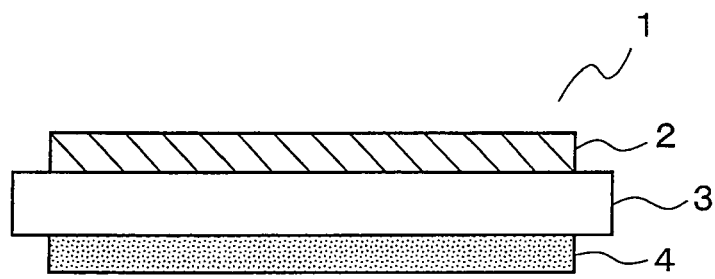
FIG. 5 is a sectional view illustrating the structure of a conventional electric power generation cell.
Figure 6:
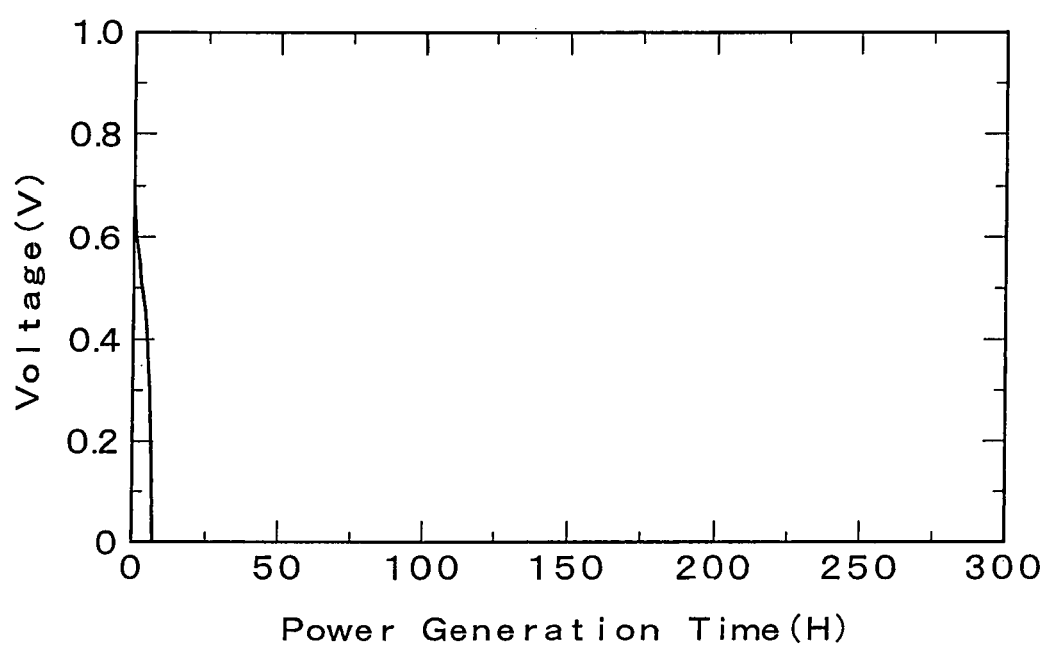
FIG. 6 is a graph showing an electric power generation property of the conventional electric power generation cell shown in FIG. 5.

With reference to FIG. 5, the materials for the air electrode layer 2 and the solid electrolyte layer 3 were respectively the same as those in the above described example; the composition ratio of component materials in the fuel electrode layer 4 was such that Ni(60 vol %)/$Ce_{0.8}Sm_{0.2}O_2$ (40 vol %); and thus a power cell was formed and the obtained electric power generation property is shown in FIG. 6.

As can be clearly seen from FIG. 3 and FIG. 6, the results of the durability tests were such that a sharp performance degradation (voltage fall) was observed for the conventional electric power generation cell at an elapsed time less than 10 hours, but on the contrary, for the electric power generation cell of the present invention, the performance degradation was extremely small even after the elapsed time of 300 hours, and thus it has been confirmed that the configuration of the present invention can drastically improve the durability.

In the example illustrated in FIG. 2, the fuel electrode layer 4 was made to have a laminated structure constituted with three layers each different in the composition ratio of component materials; however, the structure of the fuel electrode layer is not limited to laminated structures, but is optional as far as there can be formed a fuel electrode layer in which the composition ratio of component materials in the fuel electrode layer is graded along the thickness thereof.

Examples of such graded forms of composition ratio of component materials include the cases shown in FIG. 4a to FIG. 4d. In these figures, reference numeral 1 denotes a power cell, reference numeral 2 denotes an air electrode layer, reference numeral 3 denotes a solid electrolyte layer, and reference numeral 4 denotes a fuel electrode layer.

Figure 4A:
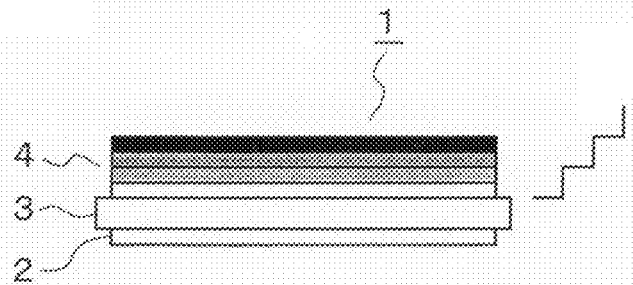
FIG. 4a, FIG. 4b, FIG. 4c and FIG. 4d are sectional views each illustrating the graded conditions of the composition ratio of component materials in the fuel electrode layer.

FIG. 4a shows a case in which the composition ratio of component materials is graded by layering (a step like gradation); plural layers different in the composition ratio of component materials are laminated, whereby as the whole fuel electrode layer 4 having a laminated structure, the composition ratio of component materials in the fuel electrode layer is graded along the thickness thereof.

Figure 4B:
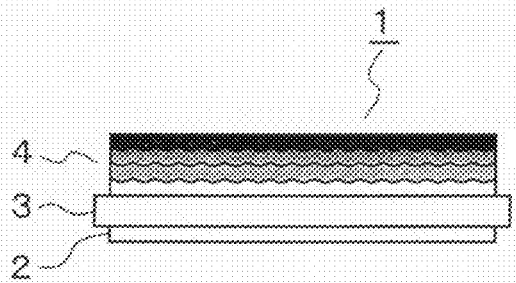

FIG. 4b shows a case in which the layering interfaces in FIG. 4a are provided with concavities and convexities (for example, corrugated shapes).

Figure 4C:
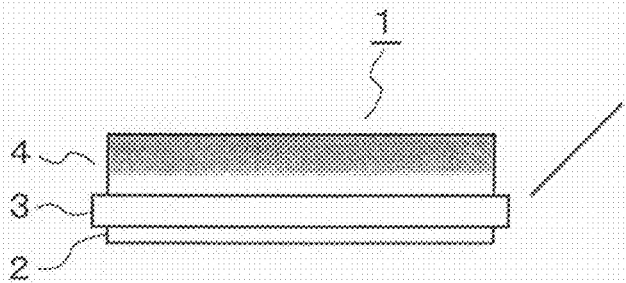

FIG. 4c shows a case in which the composition ratio of component materials is continuously graded (a slope like gradation); the fuel electrode layer 4 is formed as a single layer in such a way that the composition ratio of component materials in the fuel electrode layer is varied continuously along the thickness thereof.

Figure 4D:
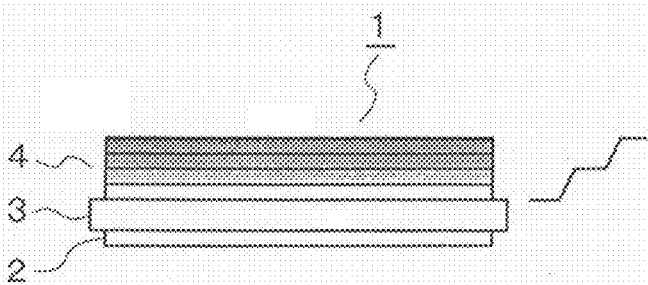

FIG. 4d shows a composite of the cases of FIG. 4a and FIG. 4c; plural layers are laminated in such a way that the plural layers each varied continuously in the composition ratio of component materials along the thickness are laminated, and moreover, as the whole fuel electrode layer 4 having a laminated structure, the composition ratio of component materials in the fuel electrode layer is graded along the thickness thereof.

Incidentally, the line figures depicted on the right hand side of each of FIG. 4a to FIG. 4d (except for FIG. 4b) show schematically the respective graded conditions of the composition ratio of component materials for the sake of easy understanding.

Additionally, in the above described example, as the material to be mixed with Ni, $Ce_{0.8}Sm_{0.2}O_2$ was used; however, such a material is not limited to this material, but is optional as far as the material is an oxide ion conductor or a mixed ion conductor. For example, lanthanum gallate, a stabilized zirconia and the like can be used.

INDUSTRIAL APPLICABILITY

As described above, according to the present invention having a configuration in which the solid electrolyte layer is made to have a two layer structure including a first electrolyte layer made of a ceria based oxide material and a second electrolyte layer made of a lanthanum gallate based oxide material, with the second electrolyte layer formed on the side of the air electrode layer, the contactability between the solid electrolyte layer and the respective electrode layers is improved, and the internal resistances of the respective electrode layers in the interfaces can be reduced. Consequently, a power cell having a high electromotive force with a reduced IR loss can be actualized.

Additionally, by making the thickness of the first electrolyte layer thinner than the thickness of the second electrolyte layer, the used amount of the expensive lanthanum gallate based oxide material is made smaller and thus the cost reduction for the electric power generation cell can be achieved.

Furthermore, according to the present invention having a configuration in which the composition ratio of component materials in the fuel electrode layer is graded along the thickness thereof, the resistance to the exfoliation between the fuel electrode layer and the solid electrolyte layer is improved, and simultaneously, the diffusion of the metals such as Ni contained in the fuel electrode layer into the solid electrolyte layer is suppressed, so that the electric power generation property of the electric power generation cell is improved and the durability of the solid oxide fuel cell can be improved.

The invention claimed is:

1. A solid oxide fuel cell provided with a power cell formed by arranging a fuel electrode layer on one surface of a solid electrolyte layer and an air electrode layer on the other surface thereof, wherein said fuel electrode layer has a single layer, which is formed of a mixture of Ni and CeSmO$_2$, and wherein the composition ratio of component materials in said fuel electrode layer varies continuously in the thickness direction thereof in such a way that the mixing ratio of Ni is increased with distance from the interface with said solid electrolyte layer.

* * * * *